United States Patent [19]

Lee

[11] Patent Number: 5,299,965
[45] Date of Patent: Apr. 5, 1994

[54] LASER WELDING METHOD FOR PREPARATION OF ELECTRON GUN OF COLOR CATHODE-RAY TUBE

[75] Inventor: Hee S. Lee, Seoul, Rep. of Korea

[73] Assignee: Goldstar Co., Ltd., Seoul, Rep. of Korea

[21] Appl. No.: 993,631

[22] Filed: Dec. 21, 1992

[30] Foreign Application Priority Data

Dec. 28, 1991 [KR] Rep. of Korea ............... 24901/1991

[51] Int. Cl.$^5$ ..................... H01J 9/02; B23K 26/02
[52] U.S. Cl. ............................. 445/36; 228/251; 219/121.64; 445/34
[58] Field of Search ........... 219/121.64; 228/251; 445/36, 34

[56] References Cited

FOREIGN PATENT DOCUMENTS

| 57-88992 | 6/1982 | Japan | 219/121.64 |
| 59-58739 | 4/1984 | Japan | 445/34 |
| 63-130290 | 6/1988 | Japan | 219/121.64 |
| 3-155487 | 7/1991 | Japan | 219/121.64 |

*Primary Examiner*—Paula A. Bradley
*Assistant Examiner*—Jeffrey T. Knapp
*Attorney, Agent, or Firm*—Birch, Stewart, Kolasch & Birch

[57] ABSTRACT

A laser welding method for preparation of an electron gun of a color cathode-ray tub. This laser welding comprises the steps of forming a coining part on an evaporation section of a weld zone of an upper part to be welded to a lower part, and focusing a laser beam on a bottom surface of the coining part. This coining part has a diameter larger than a diameter of the evaporation section and is formed in such a manner that it permits the weld zone of the upper part to have a predetermined thickness. In accordance with this laser welding, a weld nugget formed at the juncture between the upper and lower parts by is enlarged in its diameter and, as a result, increases the weld strength between the upper and lower parts. The coining part has a bottom surface of a plane surface or a curved surface. This laser welding can weld all of the parts of the electron gun even when an upper part to be welded to a lower part is thicker than the lower part and permit the welding condition to be easily determined.

3 Claims, 6 Drawing Sheets

LASER WELDING METHOD FOR PREPARATION OF ELECTRON GUN OF COLOR CATHODE-RAY TUBE

BACKGROUND OF THE INVENTION

1. Field of the Invention

The present invention relates in general to an improvement of a method for preparation of an electron gun of a color cathode-ray tube, and more particularly to an improved laser welding method for efficiently assembling all of the parts of the electron gun in which a coining part is formed on a weld zone prior to the laser welding.

2. Description of the Prior Art

As is well known to those skilled in the art, a color cathode-ray tube (or a color picture tube) has an electron gun which emits electrons, accelerates these electrons in order to make these electrons become an electron beam, and thereafter, focuses the electron beam on a phosphor screen.

Figure 1:
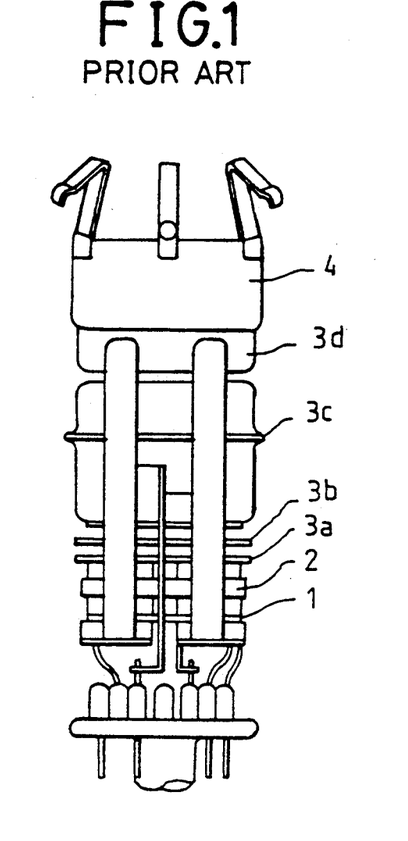
FIG. 1 is a front view showing a known electron gun of a color cathode-ray tube.

With reference to FIG. 1 showing a construction of a conventional electron gun of a color cathode-ray tube, the electron gun includes a cathode 1 for emitting electrons which are to become an electron beam. This cathode 1 includes a heater therein and is supported by a cathode supporter 2 which is arranged at the front of the cathode 1. The electron gun 1 further includes four anodes, first to fourth anodes 3a to 3d, for condensing and accelerating these electrons emitted from the cathode 1 and making these electrons become the electron beam, and thereafter, focusing the electron beam on a phosphor screen (not shown) of the color cathode-ray tube. In order to mount this electron gun on a neck part of the cathode-ray tube, this electron gun also includes a shield cup 4 at the front of the fourth anode 3d. This shield cup 4 has a valve space contact and a getter spring which are welded thereto.

Here, the aforementioned parts 1, 3a, 3b, 3c, 3d and 4 of a conventional electron gun are arranged in a line and connected, using electric insulation glass beads, to each other with predetermined intervals therebetween. These parts of the electron gun are, for the most part, made of nonmagnetic stainless steel thin plates and assembled into the electron gun by welding at about 100 weld zones.

In preparation of the electron gun of the color cathode-ray tube, the parts of the electron gun have been generally welded using a conventional electric resistance welding.

Figure 2:
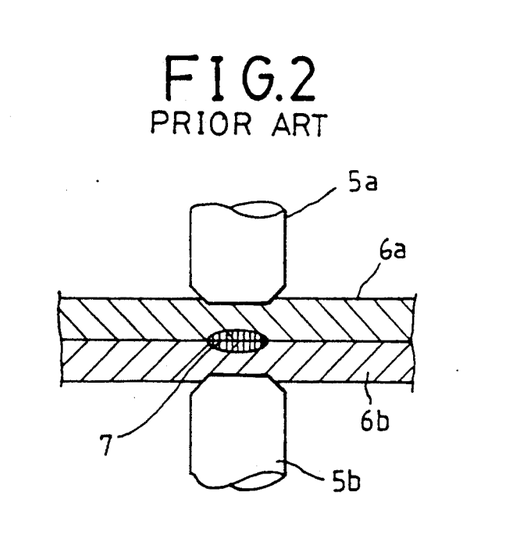
FIG. 2 is a sectioned view showing an embodiment of a conventional electric resistance welding.

FIG. 2 shows a representative embodiment of conventional electric resistance welding. As depicted in this drawing, an upper metal part 6a and a lower metal part 6b to be welded to each other are arranged between the upper and lower electrodes 5a and 5b in such a manner that the one metal 6a lies upon the other metal 6b. At this state, turning power on simultaneously with compressing the metals 6a and 6b generates electric resistance heat between the metals 6a and 6b and this causes a weld nugget 7 to be formed between the upper and lower parts 6a and 6b. As a result, the metals 6a and 6b are welded to each other.

However in such electric resistance welding, the upper metal 6a is overheated when power for the electrodes 5a and 5b is turned on and this causes the liquid metal of the upper part 6a to disperse in all directions in order to form a plurality of metal splashes. In this respect, the use of conventional electric resistance welding in preparation of the electron gun presents a problem to the result electron gun. Otherwise stated, each of the metal splashes resulted from the electric resistance welding has electric charge which causes a discharge inferiority of the electron gun. Furthermore, since the metal parts of the electron gun should be compressed during the electric resistance welding, the metal parts are apt to be deformed and, as a result, desired accuracy of the metal parts may be not accomplished. Hence, another problem of this electric resistance welding is resides in that it causes the operational performance of the result color cathode-ray tube combined with the electron gun to be necessarily deteriorated.

In order to overcome the problems introduced in using the conventional electric resistance welding for preparation of the electron gun, there has been proposed the use of laser welding.

In conventional laser welding, a laser medium arranged between two reflectors of a laser generator is energized in order to emit a light which in turn becomes an intense laser beam of high energy by reciprocating between the reflectors. This intense laser beam is then focused, using a focusing lens, on a desired weld zone of the metal parts to be welded. As a result, a weld nugget is formed at the weld zone and the metal parts are welded to each other by the weld nugget.

Figure 3A:
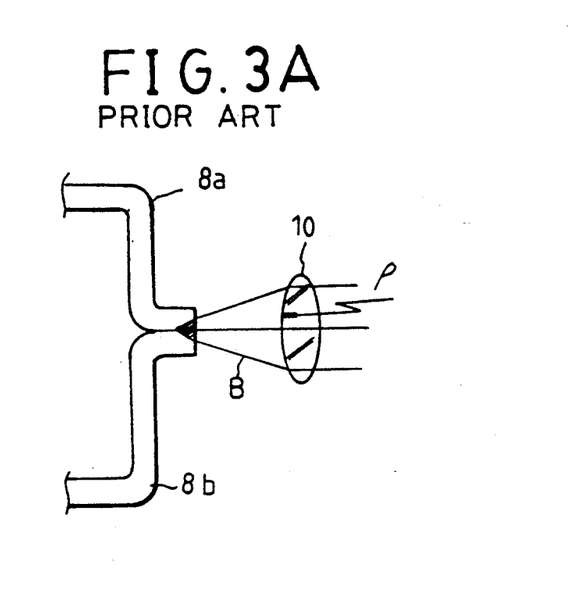
FIG. 3A shows an embodiment of a laser welding wherein the laser beam is laterally focused on the weld zone.
Figure 3B:
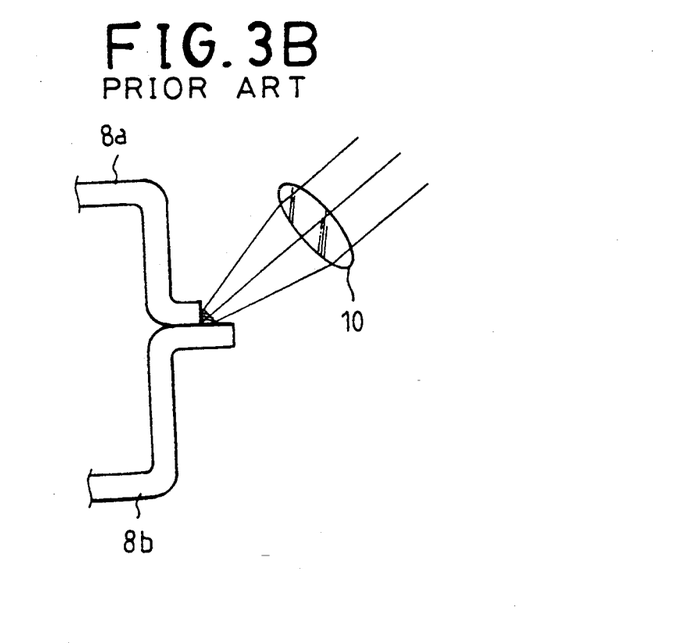
FIG. 3B shows another embodiment of a laser welding wherein the laser beam is downwardly inclinedly focused on the weld zone.

With reference to FIGS. 3A and 3B showing conventional laser welding for welding an upper part 8a to a lower part 8b in order to provide a cap-shaped product, respectively, a laser beam B is focused on a weld zone between the parts 8a and 8b using a focusing lens 10.

Here, FIG. 3A shows an embodiment of the conventional laser welding wherein the laser beam B is laterally focused on the weld zone, while FIG. 3B shows another embodiment of the conventional laser welding wherein the laser beam B is downwardly inclinedly focused on the weld zone.

In these conventional laser weldings, when the thickness of the upper part 8a is at least similar to that of the lower part 8b and the weld zone is provided, similarly to a conventional butt welding, at the corner of the juncture of the parts 8a and 8b as depicted in FIGS. 3A and 3B, the weld penetration is formed between the upper and lower parts 8a and 8b with at least similar penetration depth and, in this respect, there is no problem in providing a desired weld strength for the result cap-shaped product.

Figure 6A:
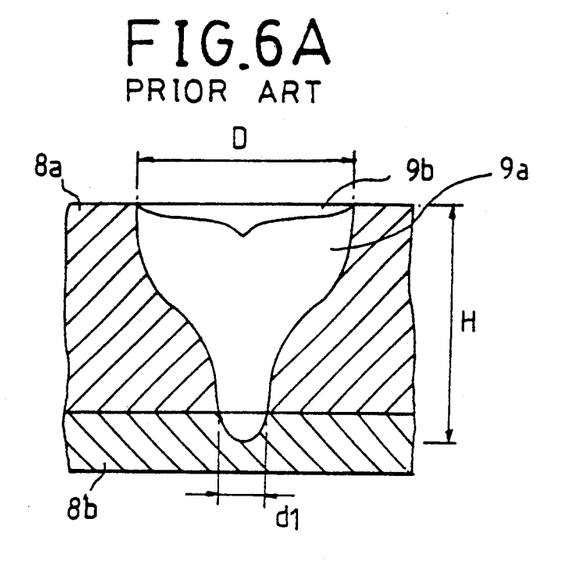
FIG. 6A shows a weld zone when the thickness of an upper part is larger than that of a lower part.
Figure 6B:
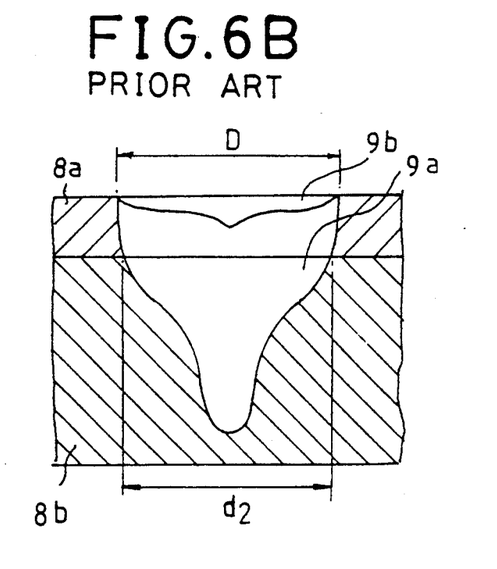
FIG. 6B shows a weld zone when the thickness of an upper part is smaller than that of a lower part.

However, when the thickness of the upper part 8a is different from that of the lower part 8b as shown in FIGS. 6A and 6B, it is very important to determine the diameter d ($d_1$ and $d_2$) of the weld nugget of the juncture of the parts 8a and 8b in order to provide the desired weld strength for the result product.

If described in detail, it is noted that the weld nugget diameter d ($d_1$ and $d_2$) is a very important factor in determining the weld strength P of a spot welding using the laser beam as represented in the following expressions. That is, when you let the area of the weld zone be A and the shearing strength of the material of the parts 8a and 8b be $\sigma s$, the weld strength P is represented by the expressions:

$$A = \pi \cdot (d/2)^2$$

$$P = A \cdot \sigma s = \pi \cdot (d/2)^2 \cdot \sigma s$$

wherein d is the weld nugget diameter at the juncture of the parts 8a and 8b.

Figure 4:
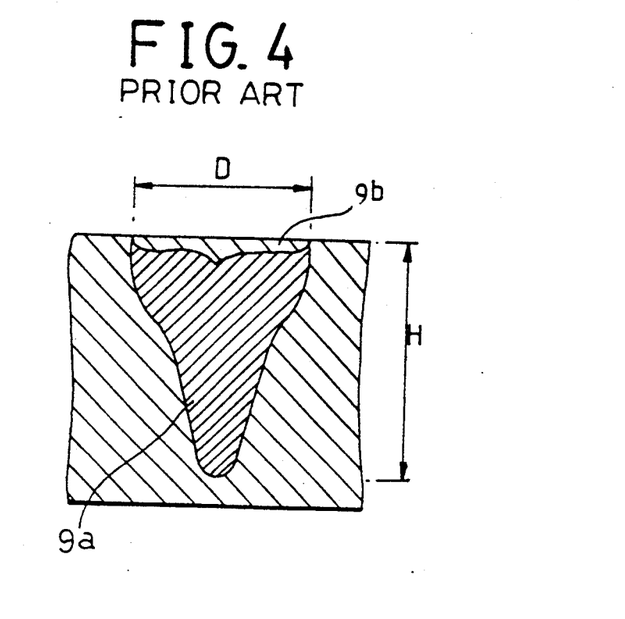
FIG. 4 is an enlarged sectioned view of a weld zone of a part welded by the known laser welding for showing an evaporation section of the weld zone.
Figure 5:
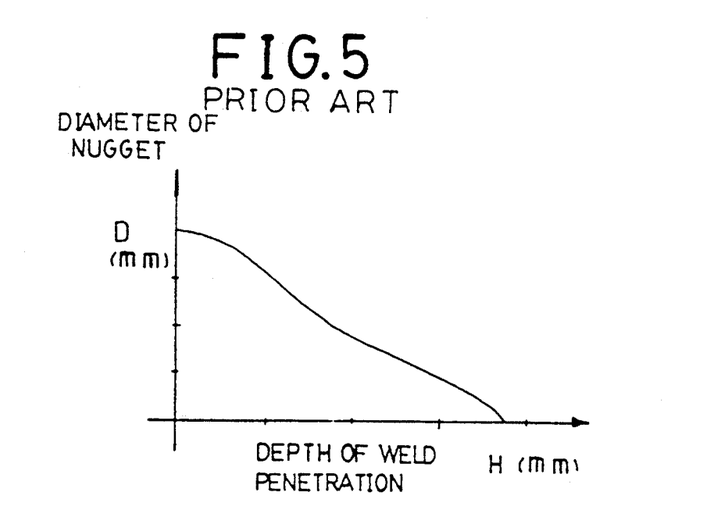
FIG. 5 is a graph showing the relation between the depth of weld penetration and the diameter of a weld nugget.

Conventionally, the parts of the electron gun mostly have thicknesses ranged from 0.1 mm to 1.0 mm, respectively. In addition, as depicted in FIGS. 4, 6a and 6b, the known spot welding using the laser beam generally causes an evaporation section 9b having a diameter D to be formed on a surface of a part, for example, the upper part 8a, on which the laser beam is to be focused by the focusing lens 10. The weld nugget diameter d ($d_1$ and $d_2$) is rapidly reduced in proportion to the depth H of the weld penetration 9a.

Particularly, when the upper part 8a has a thickness larger than that of the lower part 8b as depicted in FIG. 6A, the weld nugget has a very small diameter $d_1$ at the juncture between the upper and lower parts 8a and 8b. In this respect, it is difficult to determine the welding condition when the thickness of the upper part 8a is larger than that of the lower part 8b as described above.

For example, when the thickness of the upper part 8a is 1.0 mm and the thickness of the lower part 8b is 0.2 mm, the diameter $d_1$ of the weld nugget at the juncture between the upper and lower parts 8a and 8b is only about ⅓ of the diameter $d_2$ of the weld nugget at the juncture when the thickness of the upper part 8a is 0.2 mm and the thickness of the lower part 8b is 1.0 mm as shown in FIG. 6B. Thus, it is noted that the weld strength is deteriorated when the thickness of the upper part 8a is larger than that of the lower part 8b.

Furthermore, in order to determine the optimum weld strength of the parts 8a and 8b in the known laser welding for preparation of the electron gun, there is a requirement to control the capacity of the laser generator one by one in accordance with the thicknesses of the parts 8a and 8b. Otherwise, the existing focusing lens 10 should be substituted with another focusing lens having a different radius of curvature $\rho$ and satisfying the optimum welding condition. In this regard, another problem of the known laser welding is resides in that it is very difficult to determine the welding condition.

In accordance with the above, it is noted that the known laser welding can be used only when the thickness of the upper part 8a is at least similar to that of the lower part 8b and the weld zone is provided, similarly to the conventional butt welding, at the corner of the juncture of the parts 8a and 8b as depicted in FIGS. 3A and 3B or when the thickness of the upper part 8a is smaller than that of the lower part 8b. Another disadvantage of this known laser welding is resides in that it cannot be used when the thickness of the upper part 8a is larger than that of the lower part 8b.

SUMMARY OF THE INVENTION

It is, therefore, a primary object of the present invention to provide a laser welding method for preparation of an electron gun of a color cathode-ray tube in which the aforementioned disadvantages can be overcome and which provides a desired weld strength for the result structure of the electron gun even when there is a larger thickness difference between upper and lower parts to be welded to each other, and more particularly when the thickness of the upper part is larger than that of the lower part and permits the welding condition to be easily determined.

It is another object of the present invention to provide a laser welding method for the preparation of an electron gun of a color cathode-ray tube which permits all of the parts of the electron gun to be assembled using a laser beam.

It is another object of the present invention to provide a laser welding method for preparation of an electron gun of a color cathode-ray tube in which the upper parts are constructed to have weld zones of a uniform thickness and, in this respect, permits all of the parts of the electron gun to be assembled by laser welding using one laser welding machine.

In an embodiment, the above objects of the present invention can be accomplished by providing a laser welding method for preparation of an electron gun of a color cathode-ray tube comprising the steps of: forming a coining part on an evaporation section of a weld zone of an upper part to be welded to a lower part, said coining part having a diameter larger than that of the evaporation section; and focusing a laser beam on a bottom surface of the coining part, whereby a weld nugget formed at the juncture between the upper and lower parts is enlarged in its diameter and, as a result, increases the weld strength.

The present laser welding method is particularly suitable for welding the upper and lower parts to each other when the upper part has a larger thickness than that of the lower part. In addition, the bottom surface of the coining part has a plane surface or a curved surface.

BRIEF DESCRIPTION OF THE DRAWINGS

The above and other objects, features and other advantages of the present invention will be more clearly understood from the following detailed description taken in conjunction with the accompanying drawings, in which:

FIGS. 3A and 3B show conventional laser weldings for welding an upper part to a lower part in order to provide a cap-shaped product, respectively, in which:

FIGS. 6A and 6B are enlarged sectioned views of weld zones of parts welded to each other by the known laser welding, respectively, in which:

DESCRIPTION OF THE PREFERRED EMBODIMENTS

Figure 7:
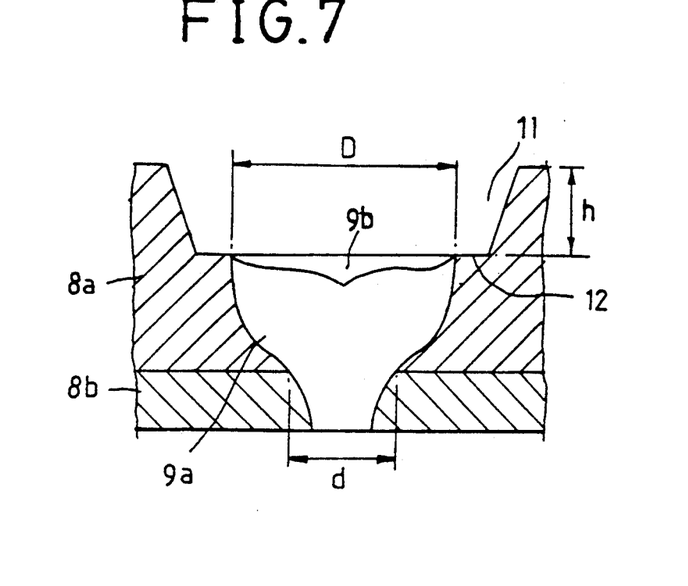
FIG. 7 is a view corresponding to FIG. 6A, but showing an embodiment of the present invention.

With reference to FIG. 7 which shows a weld zone of upper and lower parts welded to each other by a laser welding of this invention, this drawing shows the weld zone when the thickness of the upper part $8a$ is larger than that of the lower part $8b$.

As depicted in this drawing, in the laser welding of this invention, a coining part 11 is formed, prior to laser welding, on an evaporation section $9a$ of a weld zone of the upper part $8a$ to be welded to the lower part $8b$. This coining part 11 has a diameter larger than a diameter D of the evaporation section $9a$. Thereafter, a laser beam B is focused on a bottom surface 12 of the coining part 11 using a focusing lens 10, thereby causing a weld nugget to be formed at the juncture between the upper and lower parts $8a$ and $8b$. This weld nugget is enlarged in its diameter d and, as a result, the weld strength between the parts $8a$ and $8b$ is increased.

Figure 8:
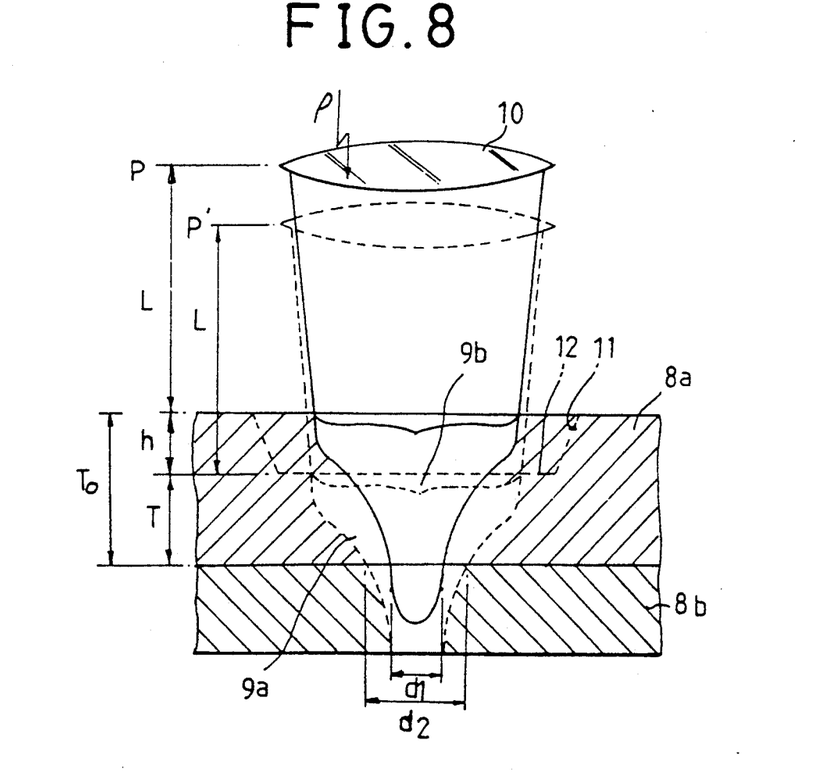
FIG. 8 is a sectioned view of a weld zone in order to compare the laser welding of the present invention with that of the prior art.

The thickness T of the upper part $8a$ of this invention is calculated by subtracting the height h of the coining part 11 from the whole thickness To of the upper part $8a$ as depicted in FIG. 8 showing the weld zone of this invention for comparing the laser welding of this invention with that of the prior part.

Here, the coining part 11 is formed by coining, a type of pressing, which is a plastic working wherein the raw material of the upper part $8a$ is embossed or engraved and, as a result, the thickness thereof is varied. In order to form the coining part 11 using the coining, it is required to use a punch and die having the coining shape coinciding with the shape of the desired coining part 11.

In the embodiment of FIG. 7, the coining part 11 is formed in order to have a plane bottom surface 12.

Referring to FIG. 8, in the laser welding of the prior art, a focusing lens 10 having a radius of curvature $\rho$ is arranged at a position spaced apart from the outermost surface of the upper part $8a$ by a distance L. This distance L is the vertical distance from the outermost surface of the upper part $8a$ to a center line 1 of the focusing lens 10. However, in accordance with the laser welding of this invention, the focusing lens 10 having the same radius of curvature is arranged at a position which is desirably closer to the outermost surface of the upper part $8a$ by the depth h of the coining part 11.

In the laser welding of this invention, when the upper part $8a$, which are to be welded to the lower part $8b$ by laser welding, have respective different thicknesses, it is required to shift the focusing lens 10 one by one in accordance with the thicknesses T of the weld zones of the upper parts $8a$ determined by the coining parts 11. However, when the coining parts 11 are formed in order to cause the thicknesses T of the weld zones of the upper parts $8a$ to be equal to each other, the laser weldings for the upper parts $8a$ having different thicknesses can be carried out under the condition that the center line of the focusing lens 10 is fixed at a predetermined position. Otherwise stated, the laser welding machine can be used for welding all of the parts under the condition that it is fixed at a predetermined position.

From FIG. 8, it is noted that when you let a diameter of a weld nugget of a weld penetration $9a$ formed by the laser welding of the prior art be $d_1$ and that of the present invention be $d_2$, the diameter $d_2$ is larger than the diameter $d_1$.

Hence, when you let a weld strength of the prior art be $P_1$ and that of the present invention be $P_2$, the weld strength $P_2$ between the upper and lower parts $8a$ and $8b$ welded to each other by the laser welding of this invention is improved in comparison with the prior art as represented by the expressions:

$$P_1 = A_1 \cdot \sigma s = \pi \cdot (d_1/2)^2 \cdot \sigma s$$
$$P_2 = A_2 \cdot \sigma s = \pi \cdot (d_2/2)^2 \cdot \sigma s$$
$$\delta P = P_2 - P_1 = (\pi \cdot (d_2/2)^2 \cdot \sigma s) - (\pi \cdot (d_1/2)^2 \cdot \sigma s)$$
$$= \pi \cdot \sigma s [(d_2/2)^2 - (d_1/2)^2]$$
$$= \pi \cdot \sigma s (d_2^2 - d_1^2)/4$$

wherein $\delta P$ is an increase of the weld strength of the present laser welding in comparison with the prior art and $\sigma s$ is a shearing strength of the upper and lower parts $8a$ and $8b$.

For example, when the relation between the diameters $d_2$ and $d_1$ is $d_2 \geq 3 \times d_1$, the weld strength $P_2$ of this laser welding is improved to an extent of nine times of that $P_1$ of the prior art as represented by the expressions:

$$\begin{aligned} P_2 &= \pi \cdot \sigma s (d_2^2)/4 \\ &= \pi \cdot \sigma s [(3 d_1)^2]/4 \\ &= \pi \cdot \sigma s (9 d_1^2)/4 \\ &= 9 P_1 \end{aligned}$$

In this respect, it is noted that the laser welding of this invention provides a desired weld strength for the result structure of the electron gun even when there is a larger thickness difference between the upper and lower parts $8a$ and $8b$ to be welded to each other, and more particularly when the thickness of the upper part $8a$ is larger than that of the lower part $8b$. Furthermore, it is possible to weld all of the parts having different thicknesses using one focusing lens 10 of a radius of curvature $\rho$, thereby permitting the welding condition to be easily determined.

Figure 9:
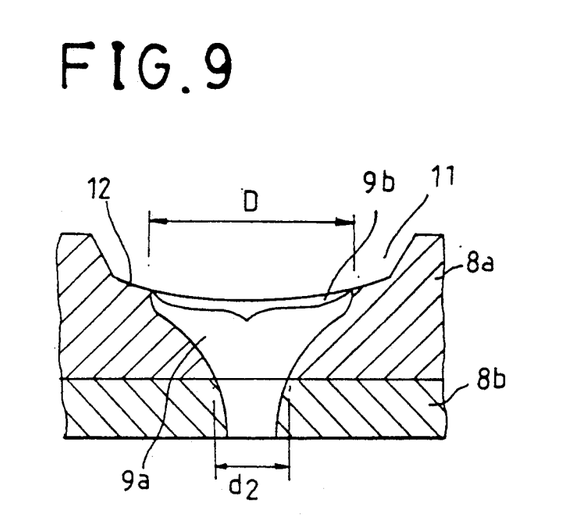
FIG. 9 is a view corresponding to FIG. 7, but showing another embodiment of the present invention.

Turning to FIG. 9 showing second or alternate embodiment of the present invention, the coining part 11 may be formed in order to have a curved bottom surface 12. Here, the average depth of the coining part 11 of this embodiment is equal to the depth h of the coining part 11 of the primary embodiment of FIG. 7. In this second alternate embodiment, the general shape of the weld zone remains the same as in the primary embodiment except for the curved bottom surface 12 of the coining part 11. Hence, those parts common to both the primary embodiment and the second or alternate embodiment will carry the same reference numerals and detailed description of those parts of the second alternate embodiment will be efficiently omitted.

As described above, this invention provides an improved laser welding suitable for preparation of an electron gun of a color cathode-ray tube. This laser welding provides a desired weld strength for the result structure of the electron gun even when there is a larger thickness difference between upper and lower parts to be welded to each other, and more particularly when the thickness of the upper part is larger than that of the lower part. Also, it is possible to weld the parts having different thicknesses using one focusing lens of a radius of curvature, thereby permitting the welding condition to be easily determined. The present invention makes it possible to easily weld all of the parts of the electron gun to each other by the laser welding. Furthermore, the present laser welding permits the thicknesses of the weld zones of the upper parts to be equal to each other, by virtue of the coining part. In this respect, all of the upper parts of the electron gun can be efficiently welded to each other using only one laser welding machine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A laser welding method for preparation of an electron gun of a color cathode-ray tube comprising the steps of:

forming a coining part of a predetermined depth and uniform thickness on an evaporation section of a weld zone of an upper part, said coining part having a diameter larger than a diameter of said evaporation section, said predetermined thickness of said coining part being related to the thickness of a lower part to be welded therewith such that a weld nugget formed thereat extends through the thickness of said lower part;

locating a focusing lens at a predetermined fixed position above said coining part; and focusing a laser beam on a bottom surface of said coining part for welding said upper part to said lower part and forming a weld nugget thereat, whereby said weld nugget which is formed at the juncture between said upper and lower parts by said laser welding is of a relatively large diameter at the mutually contacting surfaces of said upper and lower parts so as to provide a weld of relatively increased weld strength.

2. A laser welding method according to claim 1, wherein said coining part is formed by press working using a punch and a die having a coining shape coinciding with the shape of said coining part.

3. A laser welding method according to claim 1, wherein said coining part has a bottom surface of a plane surface or a curved surface.

* * * * *